UNITED STATES PATENT OFFICE.

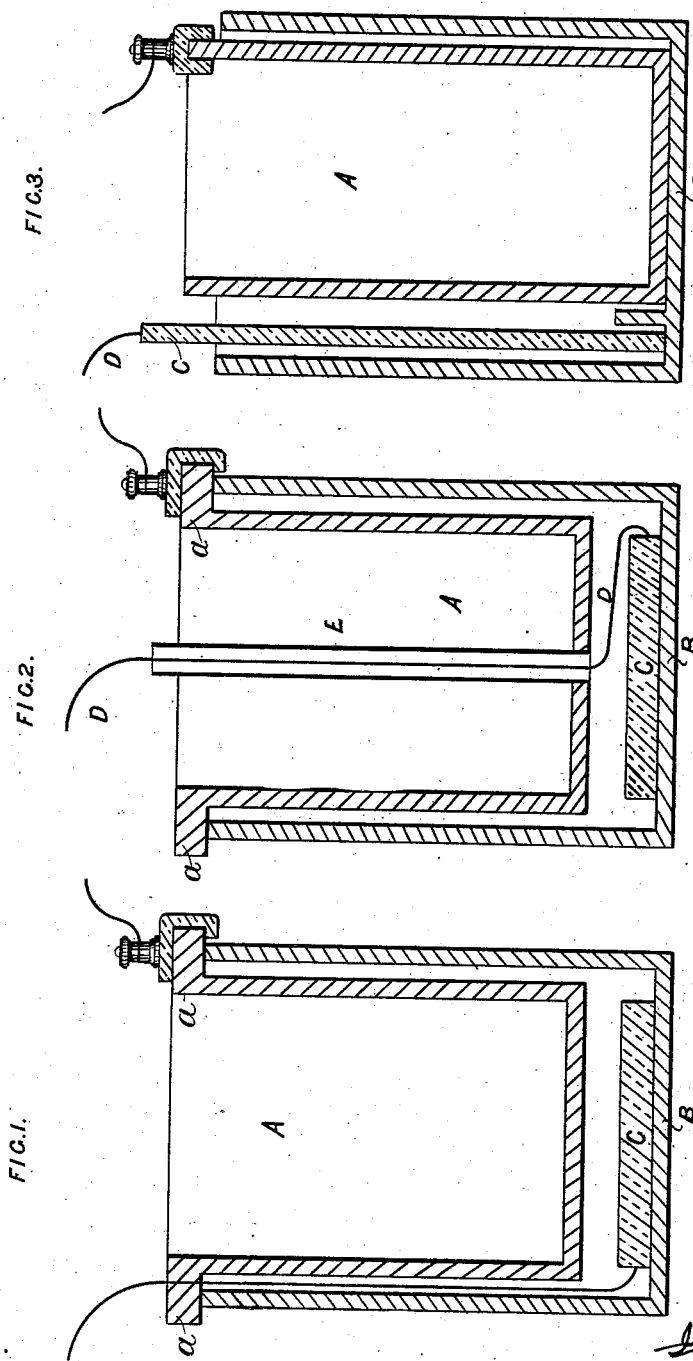

THOMAS JAMES HOWELL, OF LONDON, COUNTY OF SURREY, ENGLAND.

GALVANIC BATTERY.

SPECIFICATION forming part of Letters Patent No. 292,433, dated January 22, 1884.

Application filed October 2, 1883. (No model.) Patented in England December 30, 1882, No. 6,226.

*To all whom it may concern:*

Be it known that I, THOMAS JAMES HOWELL, a subject of the Queen of Great Britain, residing at London, in the county of Surrey and Kingdom of England, have invented certain new and useful Improvements in Galvanic Batteries, (for which I have obtained a patent in Great Britain, No. 6,226, bearing date December 30, 1882,) of which the following is a specification.

My invention relates, particularly, to the use in a galvanic battery of a porous pot made of pure carbon, (charcoal,) of manganese and carbon, plumbago and carbon, or of any other carbons found most expedient in the course of manufacture, and placed within an earthenware or any suitable insulating-vessel; and, further, in the use of special exciting fluids on the interior and exterior of said carbon pot, all as hereinafter fully described. This carbon porous pot is to play the part, in a galvanic battery, both of the carbon electrode and the ordinary earthenware porous pot or plate combined. It may be made circular, square, oblong, or of any form found in practice preferable, and with or without a tube up vertically in the center, or at the sides, for the passage of an insulated wire running from the zinc pole of the battery.

I find batteries to answer well in which my carbon porous pot is suspended, by means of a flange, lip, or other support, upon the top of an outer vessel, at some distance from the bottom; and in the chamber thus formed between the carbon pot and the bottom of the outer vessel I place a plate of zinc, and carry an insulated wire therefrom, either through a tube running up inside of the carbon pot or through the flange, lip, or suspender at top of same. I may, however, rest my carbon pot upon the bottom of the outer vessel, supporting the zinc plate vertically between the carbon pot and outer vessel by any suitable means.

Within the carbon pot I place, say, nitric acid and water in about the proportion of one-fourth of nitric acid to three-fourths of water, or vice versa; also a small quantity—say from one-half of an ounce to an ounce of fluoric acid to every six ounces of nitric acid—and in the outer compartment or vessel, say, one part of sulphuric acid to nine parts of water, together with a small quantity of free mercury, (quicksilver,) for the purpose of keeping up the amalgamation of the zinc electrode; or, in lieu of the above, I would also have it understood that any equivalents of these chemicals may be used, as required, in proportion to the size of the carbon pot and outer vessel, and that any one or part of the chemicals before named may be added when the batteries are found to be weakening.

Among the advantages of my improved battery are great electro-motive force and a very low resistance, because of the zinc and carbon electrodes working direct with each other; also, that the action of the other elements is materially incited or strengthened by the presence of fluoric acid.

Having fully described my invention, what I desire to claim, and secure by Letters Patent, is—

1. A galvanic battery having for one element a carbon pot suspended within an inclosing-vessel, and containing dilute nitro-fluoric acid, and for the other element a zinc plate adapted to be laid below the carbon pot, within said vessel, and in a solution of dilute sulphuric acid.

2. A galvanic battery having for one element a carbon pot, A, supported from the top of the inclosing-jar B by an annular flange or lip, *a*, and containing dilute nitro-fluoric acid, and for the other element a zinc plate, C, adapted to be laid below the carbon pot, within said inclosing-jar, and in a solution of dilute sulphuric acid, as set forth.

THOMAS JAMES HOWELL.

Witnesses:
  JOHN DEAN, Jr.,
  GEORGE FREDERICK WARREN,
    *Both of 17 Gracechurch Street, London.*